Aug. 12, 1924.
T. McGILL
DISH RINSER
Filed Oct. 7, 1922
1,504,827
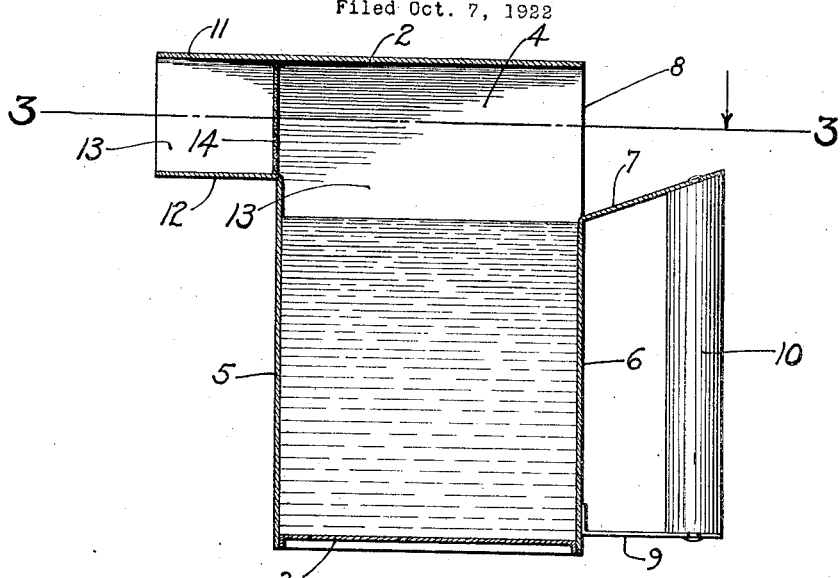
FIG. 1
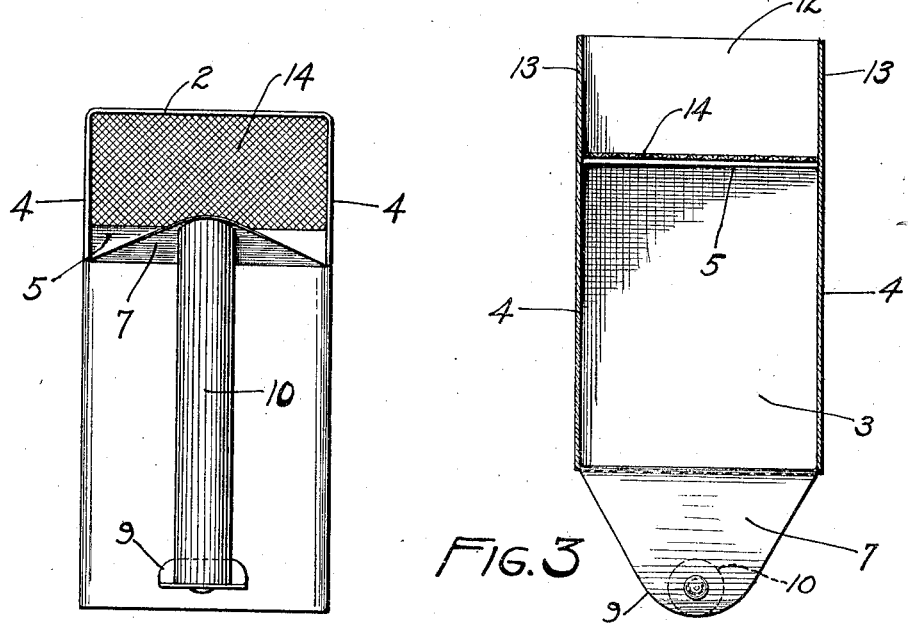
FIG. 2
FIG. 3
INVENTOR
THURSTON McGILL
ATTORNEYS Patented Aug. 12, 1924.

1,504,827

UNITED STATES PATENT OFFICE.

THURSTON McGILL, OF LA FAYETTE, INDIANA.

DISH RINSER.

Application filed October 7, 1922. Serial No. 593,072.

*To all whom it may concern:*

Be it known that I, THURSTON MCGILL, a citizen of the United States, resident of La Fayette, county of Tippecanoe, State of Indiana, have invented certain new and useful Improvements in Dish Rinsers, of which the following is a specification.

The object of my invention is to provide a dish rinsing device by means of which a quantity of hot water can be showered straight down upon dishes set on edge in a drier or any other device adapted to support the dishes in an upright position; my purpose being to so deliver the water to the dishes that they will be quickly and thoroughly rinsed without the spattering or spraying effect produced when water is poured from a kettle or pitcher or a similar small-mouthed device.

A further object is to provide a rinsing device which can be easily filled and may be readily cleaned when empty.

Other objects will appear from the following detailed description.

The invention consists generally in various constructions and combinations all as hereinafter described and particularly pointed out in the claims.

In the accompanying drawings forming part of this specification,

Figure 1 is a vertical sectional view through a dish rinser embodying my invention;

Figure 2 is a rear view of the same;

Figure 3 is a sectional view on the line 3—3 of Figure 1.

In the drawing, 2 represents the top; 3, the bottom; 4, the side walls; and 5 and 6, the front and rear walls.

I have shown the device rectangular in cross-section, but it may be made in any other suitable form as desired.

The rear wall has an outwardly turned upper portion 7 to form a filling opening 8, and a bracket 9 is mounted on its lower portion, between which and the bracket 7, a hand grip 10 is mounted. Brackets 7 and 9 are preferably rounded or tapered from their inner toward their outer ends as indicated in Figure 3. Through this filling opening 8, water may be placed in the rinser and the hand may also be conveniently inserted for wiping purposes.

Opposite the filling opening is a spout, the upper wall 11 of which is a continuation of the top wall 2, and the lower wall is an outwardly turned extension 12 of the front wall 5. Side walls 13 are continuations of the side walls 4. The spout is therefore the full width of the rinser, and at its inner end a perforated wall 14 is provided which serves as a means to hold back or retard the flow of the water, the volume of course depending upon the size of the openings in the perforated wall or the degree of obstruction therein. Through this spout and perforated wall, the water is showered straight down upon the dishes.

The user grasping the handle 10 will tilt the rinser so that the front wall thereof temporarily becomes the bottom, and in this position the full area of the spout will be in use, the perforated wall retarding the flow of water through it so that a shaft of showering water will flow gently through the spout down over the dishes, and there will be no spattering as is the case when a tea-kettle or pitcher is used. The volume of the flow will of course be commensurate with the volume of water in the rinser and the degree of perforations in the wall. These perforations will be determined by experiment until the proper size is obtained to enable the manufacturer to provide the requisite flow of water to produce the result desired.

The perforated wall 14, it will be noted, is in alignment with the wall 5 and consequently it is not necessary to gradually tip the container while it is being emptied as in the case of a tea-kettle. My improved rinser can be easily balanced on two fingers and the water will continue to be showered down upon the dishes until the container is empty. This would not be true in vessels having curved walls and comparatively small spouts in which the water can not lie directly over the spout opening until the receptacle is empty.

By turning the rear wall outwardly to form the bracket 7, I not only economize in the manufacture of the rinser but the bracket serves as a guard or protector to the hand of the user in preventing hot water from spattering thereon, and also forms a spout-like surface that is convenient in filling the rinser. With the use of this device, the dishes can be rinsed on the drain board, eliminating the necessity of lifting the drainer full of dishes into the sink for rinsing purposes and also dispensing with the necessity of wiping the dishes.

The device may be made of any suitable material, tin or aluminum as may be preferred, and its dimensions and general form may be modified in various ways and still be within the scope of my invention.

I claim as my invention:

1. A dish rinser comprising a receptacle having a closed top and bottom, a rear wall and handle thereon, said wall above said handle having a filling opening, and a spout in the front wall of said receptacle opposite said filling opening and extending the full width of the rinser, through which opening the water in said receptacle is delivered straight down upon the articles to be rinsed.

2. A dish rinser comprising a receptacle having a closed top and bottom and a rear wall provided with a handle, and a filling opening above said handle through which the hand may be inserted for washing or drying the inside of the receptacle, the forward wall of said receptacle having a comparatively large discharge opening extending from side to side the full width of the rinser, a perforated wall therein, and a spout projecting outwardly from said discharge opening.

3. A dish rinser comprising a receptacle having closed top and bottom, the rear wall of said receptacle having its upper portion outwardly turned to provide a filling opening, the outwardly turned portion of said rear wall forming a support for a hand grip and a guiding surface in filling the rinser, said rinser having a discharge opening opposite said filling opening, and a spout projecting outwardly therefrom, said filling and discharge openings extending across the full width of the rinser.

4. A dish rinser comprising a receptacle having a closed top and bottom, a rear filling opening and handle, the front wall of said rinser having a discharge opening the full width thereof opposite said filling opening, the upper portion of said front wall being outwardly and downwardly turned to form the lower wall of said spout, and the side and top walls thereof being formed by continuations of the side and top walls of said rinser.

5. A dish rinser comprising a receptacle having a closed top and bottom and substantially parallel side walls, the upper rear portion of said rinser having its wall outwardly and downwardly turned to provide a filling opening extending across the rinser, the downwardly turned portion of said wall having a handle mounted thereon, the front wall of said rinser having a discharge opening opposite said filling opening and a spout for said discharge opening, the side walls of said spout being formed by continuations of the side walls of said rinser.

In witness whereof, I have hereunto set my hand this 30th day of Sept., 1922.

THURSTON McGILL.